(12) United States Patent
    Khalid

(10) Patent No.: US 12,568,381 B2
(45) Date of Patent: Mar. 3, 2026

(54) WIFI ASSISTED SIDELINK COMMUNICATION VIA CITIZENS BROADBAND RADIO SERVICE (CBRS) SPECTRUM

(71) Applicant: Charter Communications Operating, LLC, St. Louis, MO (US)

(72) Inventor: Saran Khalid, Denver, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 314 days.

(21) Appl. No.: 18/447,377

(22) Filed: Aug. 10, 2023

(65) Prior Publication Data

US 2025/0056240 A1     Feb. 13, 2025

(51) Int. Cl.
    *H04W 16/04*        (2009.01)
    *H04W 16/14*        (2009.01)
    *H04W 64/00*        (2009.01)
    *H04W 76/10*        (2018.01)
(52) U.S. Cl.
    CPC ........... *H04W 16/14* (2013.01); *H04W 64/00* (2013.01); *H04W 76/10* (2018.02)
(58) Field of Classification Search
    CPC ................................ H04L 12/28; H04L 12/50
    USPC ................................ 370/329, 401, 402, 403
    See application file for complete search history.

(56) References Cited

U.S. PATENT DOCUMENTS

2023/0319881 A1* 10/2023 Li .......................... H04W 72/25
                                                          370/329
2024/0357430 A1* 10/2024 Dutta .................... H04W 76/15

* cited by examiner

*Primary Examiner* — Dang T Ton
(74) *Attorney, Agent, or Firm* — Young Basile Hanlon & MacFarlane, P.C.

(57)                    ABSTRACT

Methods and systems for wireless local area network system assisted sidelink communications using Citizens Broadband Radio Service (CBRS) spectrum are described herein. A method includes receiving, from a mobile device by a wireless local area network system, a request for sidelink communications with another mobile device, sending, by the wireless local area network system to a service provider system, a request for CBRS spectrum when the sidelink communications is beneficial based on at least a known location of the mobile device and a location of the another mobile device, receiving, by the wireless local area network system from the service provider system, a sidelink communications information including a CBRS grant when an interference check passes, and sending, by the wireless local area network system to at least the mobile device, the sidelink communications information to enable establishment of the sidelink communications between the mobile device and the another mobile device.

20 Claims, 10 Drawing Sheets

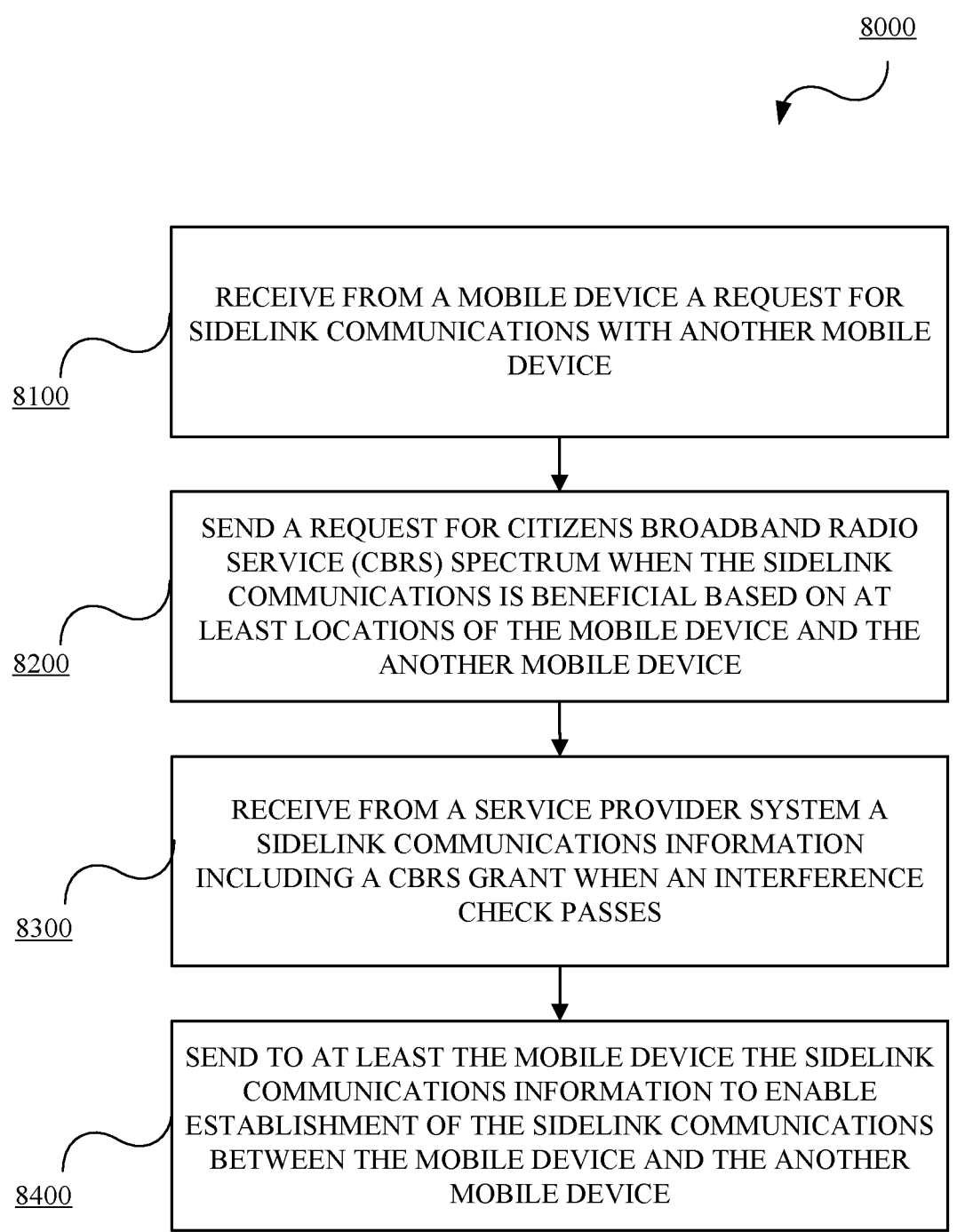

8000

RECEIVE FROM A MOBILE DEVICE A REQUEST FOR SIDELINK COMMUNICATIONS WITH ANOTHER MOBILE DEVICE

8100

SEND A REQUEST FOR CITIZENS BROADBAND RADIO SERVICE (CBRS) SPECTRUM WHEN THE SIDELINK COMMUNICATIONS IS BENEFICIAL BASED ON AT LEAST LOCATIONS OF THE MOBILE DEVICE AND THE ANOTHER MOBILE DEVICE

8200

RECEIVE FROM A SERVICE PROVIDER SYSTEM A SIDELINK COMMUNICATIONS INFORMATION INCLUDING A CBRS GRANT WHEN AN INTERFERENCE CHECK PASSES

8300

SEND TO AT LEAST THE MOBILE DEVICE THE SIDELINK COMMUNICATIONS INFORMATION TO ENABLE ESTABLISHMENT OF THE SIDELINK COMMUNICATIONS BETWEEN THE MOBILE DEVICE AND THE ANOTHER MOBILE DEVICE

WIFI ASSISTED SIDELINK COMMUNICATION VIA CITIZENS BROADBAND RADIO SERVICE (CBRS) SPECTRUM

TECHNICAL FIELD

This disclosure relates to wireless communications. More specifically, offloading to and communicating on a Citizens Broadband Radio Service (CBRS) spectrum based sidelink channel established with assistance from a WiFi system.

BACKGROUND

Wireless telecommunications or radio access technologies (RATs) generally use licensed radio frequency spectrum for communications between mobile devices and wireless telecommunications networks. For example, licensed spectrum is used for third generation (3G), fourth generation (4G), and fifth generation (5G) wireless communications. Wireless telecommunications technologies may also use unlicensed spectrum.

Citizens Broadband Radio Service (CBRS) spectrum is a type of unlicensed spectrum or shared radio frequency spectrum which is shared between multiple entities including government users (such as the military), licensed users, and non-licensed users. CBRS is a multitiered wireless band between 3.550 MHz and 3.700 MHz. In particular, CBRS is a three-tiered access framework including incumbent users (i.e., federal, military, and the like), priority access users (winning auction bidders) who have Priority Access Licenses (PALs) to CBRS spectrum, and general authorized access (GAA) users, where the general users are permitted to use any portion of the CBRS spectrum not assigned to a higher tier user and may also operate opportunistically on unused priority access spectrum. Availability of CBRS spectrum dynamically changes depending on use by higher priority entities. Higher tier users are protected from lower tier users using a centralized spectrum access system (SAS), which may be a federal or commercial entity. The SAS authorizes or grants spectrum to access points known as CBRS Devices (CBSDs) and performs interference management to protect higher tier users. This protection may include, for example, dropping CBSDs which are general authorized access users. In summary, CBRS is an interference limited network which means that the performance of the network and the data sent to CBRS subscribers is limited by the amount of interference the CBRS users or subscribers experience in the frequency band of operation.

SUMMARY

Disclosed herein is a system and method for wireless local area network system assisted sidelink communications using Citizens Broadband Radio Service (CBRS) spectrum. In an implementation, a method for wireless local area network system assisted sidelink communications using Citizens Broadband Radio Service (CBRS) spectrum includes receiving, from a mobile device by a wireless local area network system, a request for sidelink communications with another mobile device, sending, by the wireless local area network system to a service provider system, a request for Citizens Broadband Radio Service (CBRS) spectrum when the sidelink communications is beneficial based on at least a known location of the mobile device and a location of the another mobile device, receiving, by the wireless local area network system from the service provider system, a sidelink communications information including a CBRS grant when an interference check passes, and sending, by the wireless local area network system to at least the mobile device, the sidelink communications information to enable establishment of the sidelink communications between the mobile device and the another mobile device.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

FIG. 8 is a flowchart of an example method for using WiFi assisted sidelink communications using CBRS spectrum in accordance with embodiments of this disclosure.

DETAILED DESCRIPTION

Figure 1:
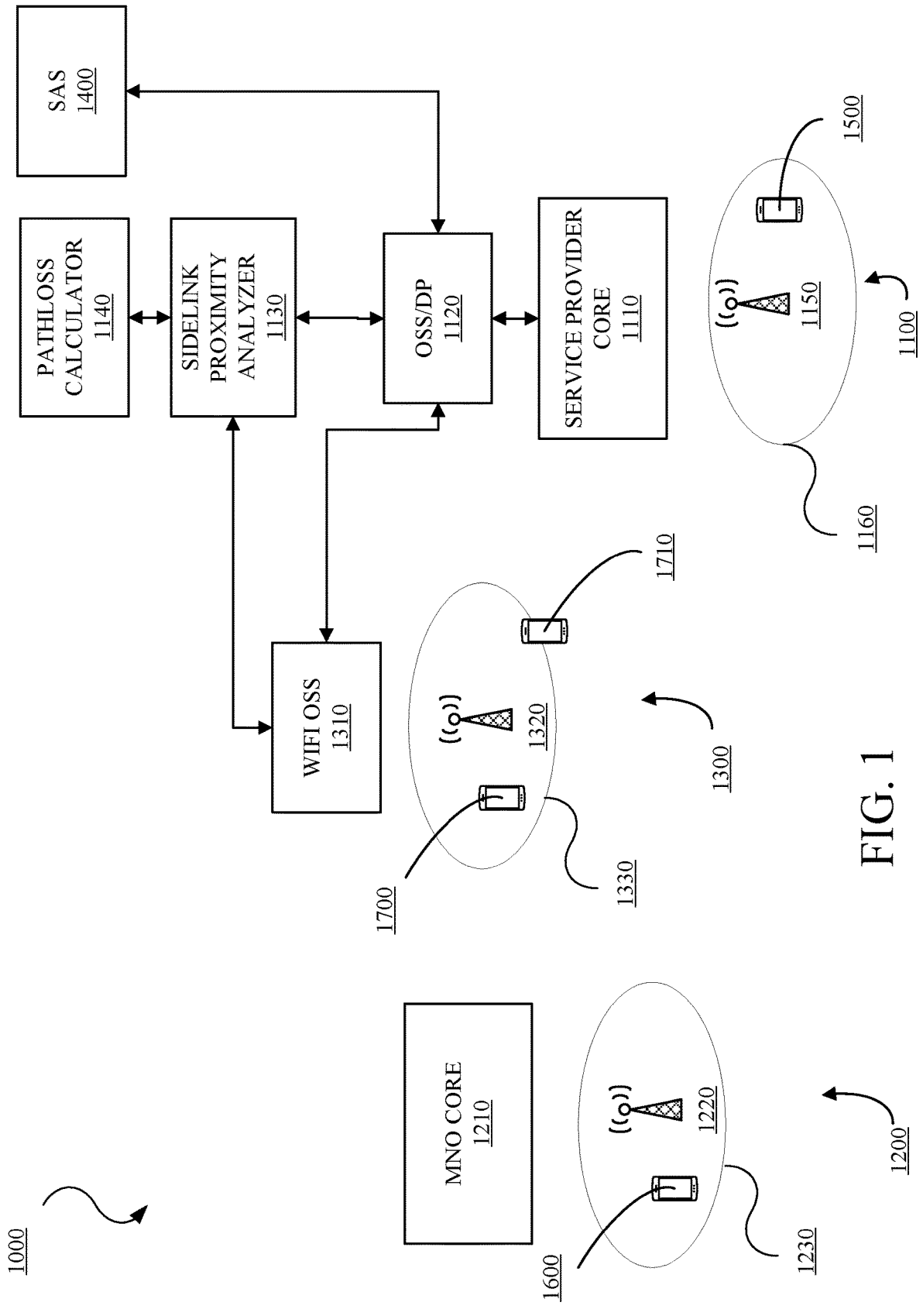
FIG. 1 is a diagram of an example of a wireless network architecture in accordance with embodiments of this disclosure.

Reference will now be made in greater detail to embodiments of the invention, examples of which are illustrated in the accompanying drawings. Wherever possible, the same reference numerals will be used throughout the drawings and the description to refer to the same or like parts.

As used herein, the terminology "server", "computer", "computing device or platform", or "cloud computing system" includes any unit, or combination of units, capable of performing any method, or any portion or portions thereof, disclosed herein. For example, the "server", "computer", "computing device or platform", or "cloud computing system" may include at least one or more processor(s).

As used herein, the terminology "processor" indicates one or more processors, such as one or more special purpose processors, one or more digital signal processors, one or more microprocessors, one or more controllers, one or more microcontrollers, one or more application processors, one or more central processing units (CPU) s, one or more graphics processing units (GPU) s, one or more digital signal processors (DSP) s, one or more application specific integrated circuits (ASIC) s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. For example, the memory can be non-transitory. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks, or activities. For example, applications may perform one or more functions including, but not limited to, telephony, web browsers, e-commerce transactions, media players, scheduling, management, smart home management, entertainment, and the like. The unit of executable software generally runs in a predetermined environment and/or a processor.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure and claims. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, and/or manufactures, while eliminating for the purpose of clarity other aspects that may be found in typical similar devices, systems, and methods. Those of ordinary skill may thus recognize that other elements and/or steps may be desirable or necessary to implement the devices, systems, and methods described herein. However, because such elements and steps do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

Described herein is a system and method for WiFi assisted sidelink communications using Citizens Broadband Radio Service (CBRS) spectrum. Mobile devices provided and provisioned by a service provider can operate in 3G, 4G, 5G, and/or other wireless communication technologies as well as in WiFi systems or wireless local area networks. In implementations, the service provider can have PAL licenses and can operate on GAA. The WiFi system and a service provider system are provided by the service provider.

In an instance, a mobile device can be out of coverage of wireless network coverage such as 3G, 4G, 5G, and/or other wireless communication technologies including those provided by the service provider and/or service provider system. The mobile device can be in a coverage area of the WiFi system. In these instances, the mobile device may want to directly communicate with another mobile device based on various factors such as, faster speeds, performance, data needs, and the like. The WiFi system can assist the mobile device in establishing a sidelink channel using CBRS spectrum provided via the service provider system. The WiFi system can assist the mobile devices, by providing access to the service provider system, in determining whether a sidelink communication opportunity exists based on mobile device locations. The WiFi system can, if the sidelink communication opportunity is viable, provide further access to the service provider system, to obtain CBRS spectrum allocation and power levels, and make interference determinations. The sidelink channel is subject to the mobile device remaining in coverage of the WiFi system, availability of the CBRS spectrum, or combinations thereof.

FIG. 1 is a diagram of an example wireless network architecture 1000. The wireless network architecture 1000 can include, but is not limited to, a service provider system 1100, a multiple systems operator (MSO) system 1200, a WiFi system 1300, and a spectrum access system (SAS) 1400. The wireless network architecture 1000 can implement any wireless technology including, but not limited to, third generation (3G), fourth generation (4G), and fifth generation (5G) wireless communications, and CBRS or shared spectrum wireless technologies. In implementations, the wireless network architecture 1000 can be a hybrid mobile virtual network operator (HMNO) network where a service provider, which owns and operates the service provider system 1100 and can operate the MSO system 1200 as a mobile virtual network operator (MVNO). In this instance, the service provider can own and/or operate one or more WiFi networks in the WiFi system 1300. The number of components shown herein are illustrative and there may be more or less in the wireless network architecture 1000. The wireless network architecture 1000 and the components therein may include other elements which may be desirable or necessary to implement the devices, systems, and methods described herein. However, because such elements and steps do not facilitate a better understanding of the disclosed embodiments, a discussion of such elements and steps may not be provided herein.

The service provider system 1100 can include a service provider core 1110, an operations support system (OSS) 1120, a sidelink proximity analyzer 1130, a pathloss calculator and/or engine 1140, and one or more base stations 1150. In implementations, the operations support system (OSS) 1120, the sidelink proximity analyzer 1130, and the pathloss calculator can be logically separate, logically integrated, physically separate, physically integrated, and/or combinations thereof.

The service provider core 1110 can include various functional components to address mobility management, authentication, session management, and other related functions with respect to, for example, the one or more base stations 1150. A base station 1150 can be an access point, an access node, or like device which enables radio communications access between mobile devices 1500 and other devices in a wireless coverage area 1160. The base station 1150 can support wireless communications via the 3G, the 4G, the 5G, and the CBRS or shared spectrum wireless technologies. In the instance that the base station 1150 uses or supports the CBRS spectrum, the base station 1150 can be, in part, a CBRS Device (CBSD), which has been granted or authorized CBRS spectrum by the SAS 1400.

The OSS 1120 can work with the WiFi system 1300, the sidelink proximity analyzer 1130, the pathloss calculator 1140, and the SAS 1400 and the other components in the service provider system 1100 to enable and/or configure a mobile device to communicate via a sidelink with another mobile device using the CBRS spectrum.

The sidelink proximity analyzer 1130 can determine whether it is beneficial to offload to a sidelink channel based on performance, data traffic needs, cost benefits, distance between mobile devices, interference considerations, power, and other related factors.

Figure 6:
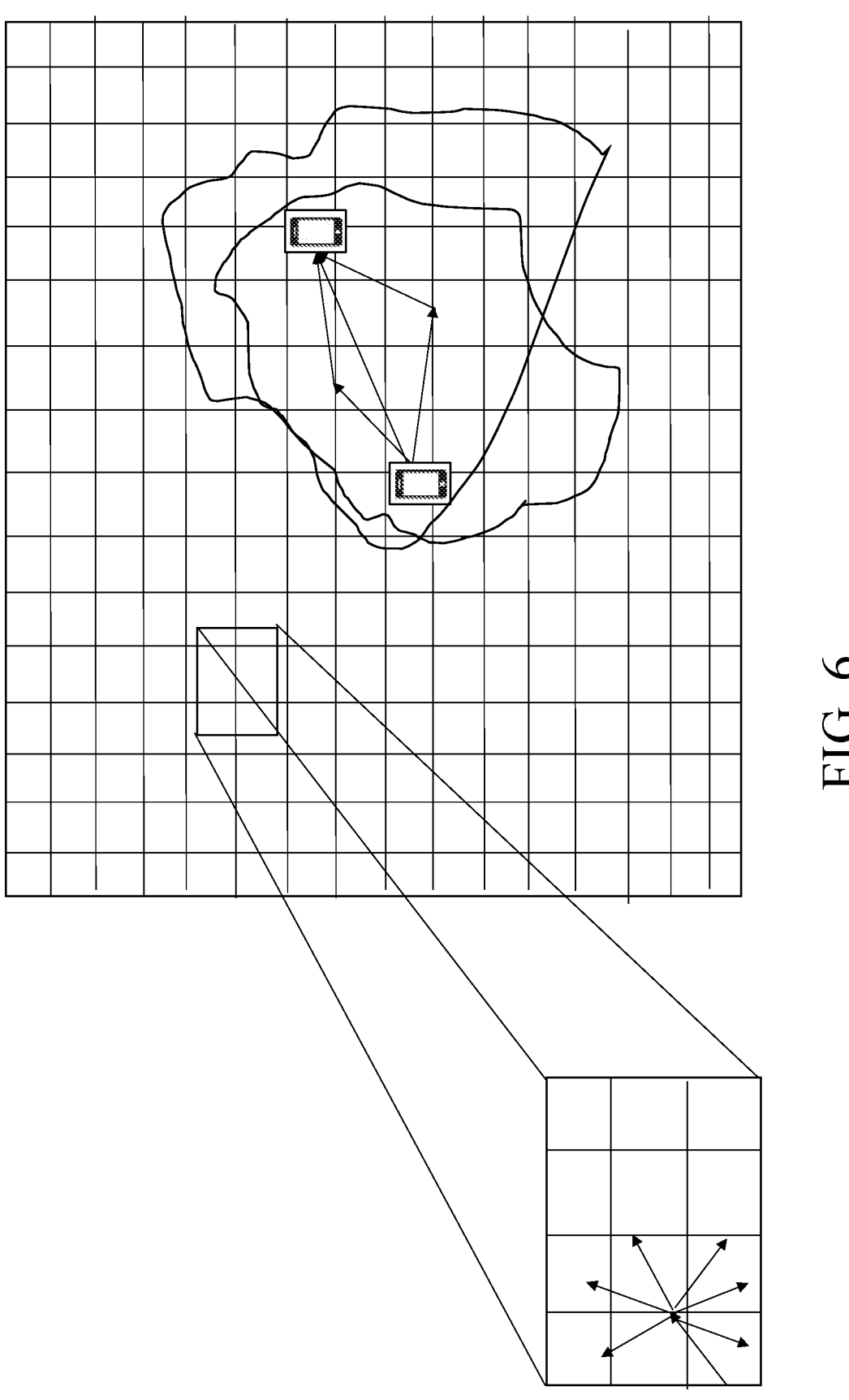
FIG. 6 is a diagram of an example of pathloss determinations between two mobile devices in accordance with embodiments of this disclosure.

The pathloss calculator or engine 1140 can evaluate and determine the pathloss between two mobile devices that are attempting to communicate over a sidelink channel using a CBRS spectrum. The pathloss calculator or engine 1140 can use the locations of the mobile devices, the capabilities of the mobile devices, and other relevant material to determine how far a mobile device can reach for communication. An example is shown in FIG. 6. Different propagation models can be used in combination with digital terrain, morphologies, buildings and/or morphology heights data.

The multiple systems operator (MSO) system 1200 can include an MSO core 1210 and one or more base stations 1220. The MSO core 1210 can include various functional components to address mobility management, authentication, session management, and other related functions with respect to, for example, the one or more base stations 1220. A base station 1220 can be an access point, an access node, or like device which enables radio communications access between mobile devices 1600 and other devices in a wireless coverage area 1230. The base station 1220 can support wireless communications via the 3G, the 4G, and the 5G wireless technologies.

The WiFi system 1300 can include a WiFi OSS 1310 and one or more base stations 1320, which can enable radio communications access between mobile devices 1700, 1710, and other devices in a wireless coverage area 1330. The WiFi OSS 1310 can work with the sidelink proximity analyzer 1130, the pathloss calculator 1140, the OSS 1120, the SAS 1400, and other components in the service provider system 1100 and the WiFi system 1300 to assist mobile devices, such as the mobile devices 1700 and 1710 to determine sidelink channel offloading opportunities. In this instance, the mobile devices 1700 and 1710 are out of coverage with respect to the MSO system 1200 and the service provider system 1100. Although the term WiFi is used herein, any wireless local area network technology or system can be used.

The SAS 1400 enables access to the CBRS spectrum and dynamically manages the spectrum for optimal use, efficiency, and compliance with CBRS rules. The SAS 1400 communicates with each base station 1150 (which can be a CBSD) for registration, grant allocation/deallocation and interference management. The SAS 1400 can perform interference analysis based on the power measurements received from mobile device(s) and make allocation and deallocation decisions based on the interference. The SAS 1400 may be operated be a commercial, federal entity, or some combination thereof.

The mobile devices 1500, 1600, 1700, and 1710 can be, but is not limited to, Internet of Thing (IoT) devices, sensors, end user devices, cellular telephones, Internet Protocol (IP) devices, mobile computers, laptops, handheld computers, personal media devices, smartphones, notebooks, notepads, and the like can be provisioned for operation with a MSO, a MVNO, and/or service provider, and can be provisioned for direct communication with each other and other mobile devices.

Operationally, the wireless network architecture 1000 is described with respect to two use cases. In a first use case, the mobile devices are within a WiFi coverage area. This is described with respect to FIGS. 2, 3A, and 3B. In a second use case, one of the mobile devices is within a WiFi coverage area. This is described with respect to FIGS. 4, 5A, and 5B.

Figure 2:
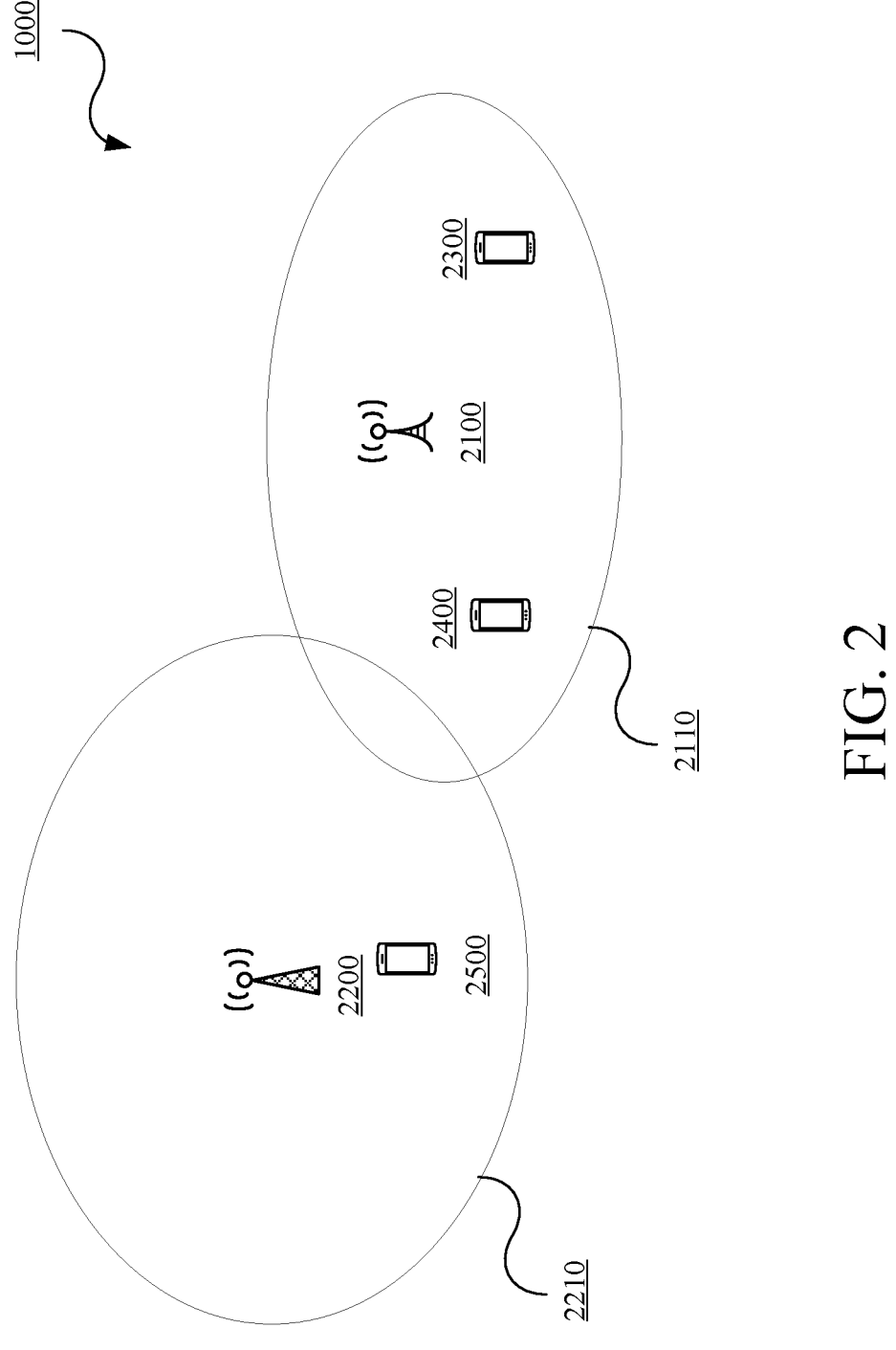
FIG. 2 is a diagram of an example of mobile devices in the wireless network architecture of FIG. 1 in accordance with embodiments of this disclosure.
Figure 3A:
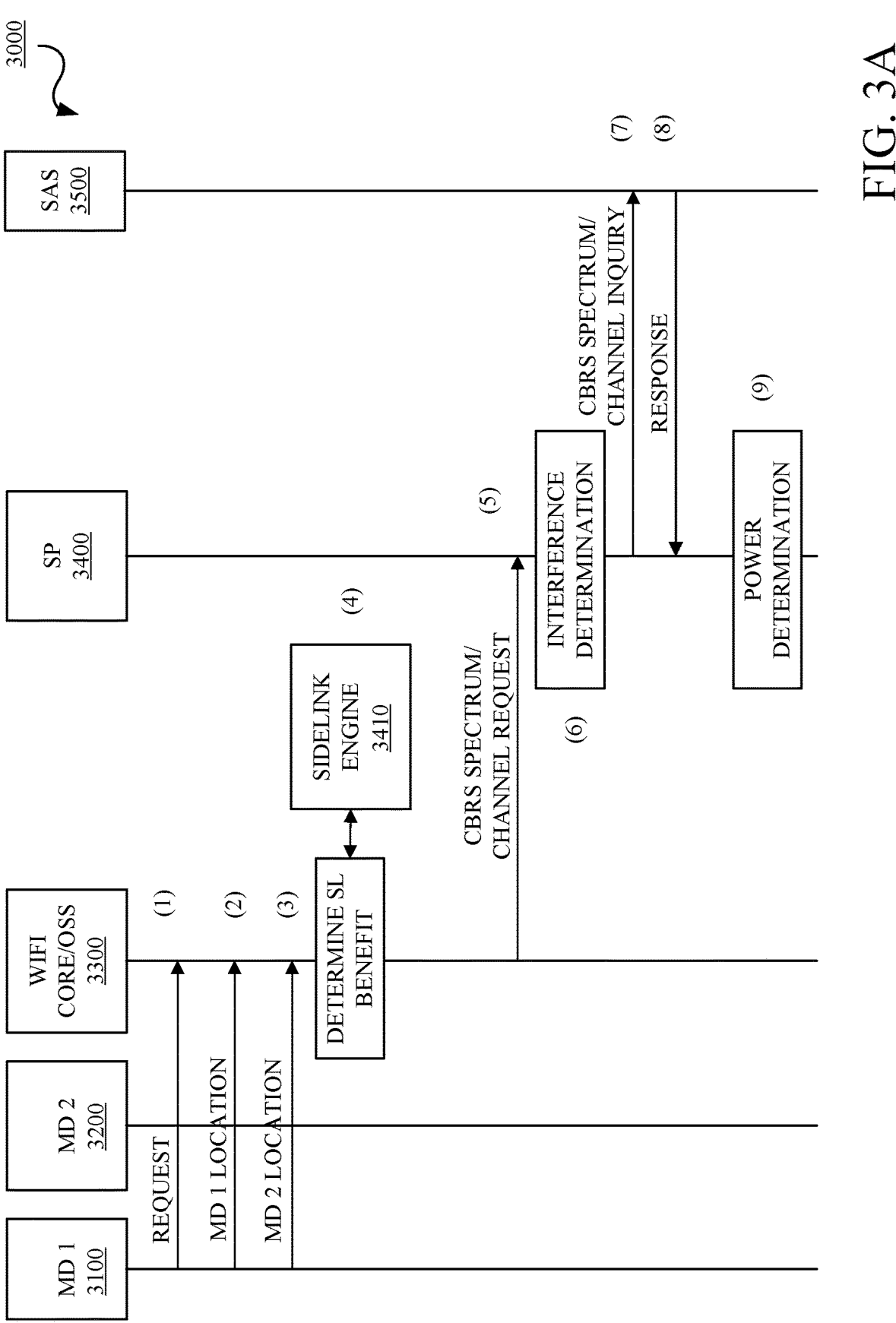
FIGS. 3A and 3B are a flow diagram of an example of a system using WiFi assisted sidelink communications using Citizens Broadband Radio Service (CBRS) spectrum in accordance with embodiments of this disclosure.
Figure 3B:
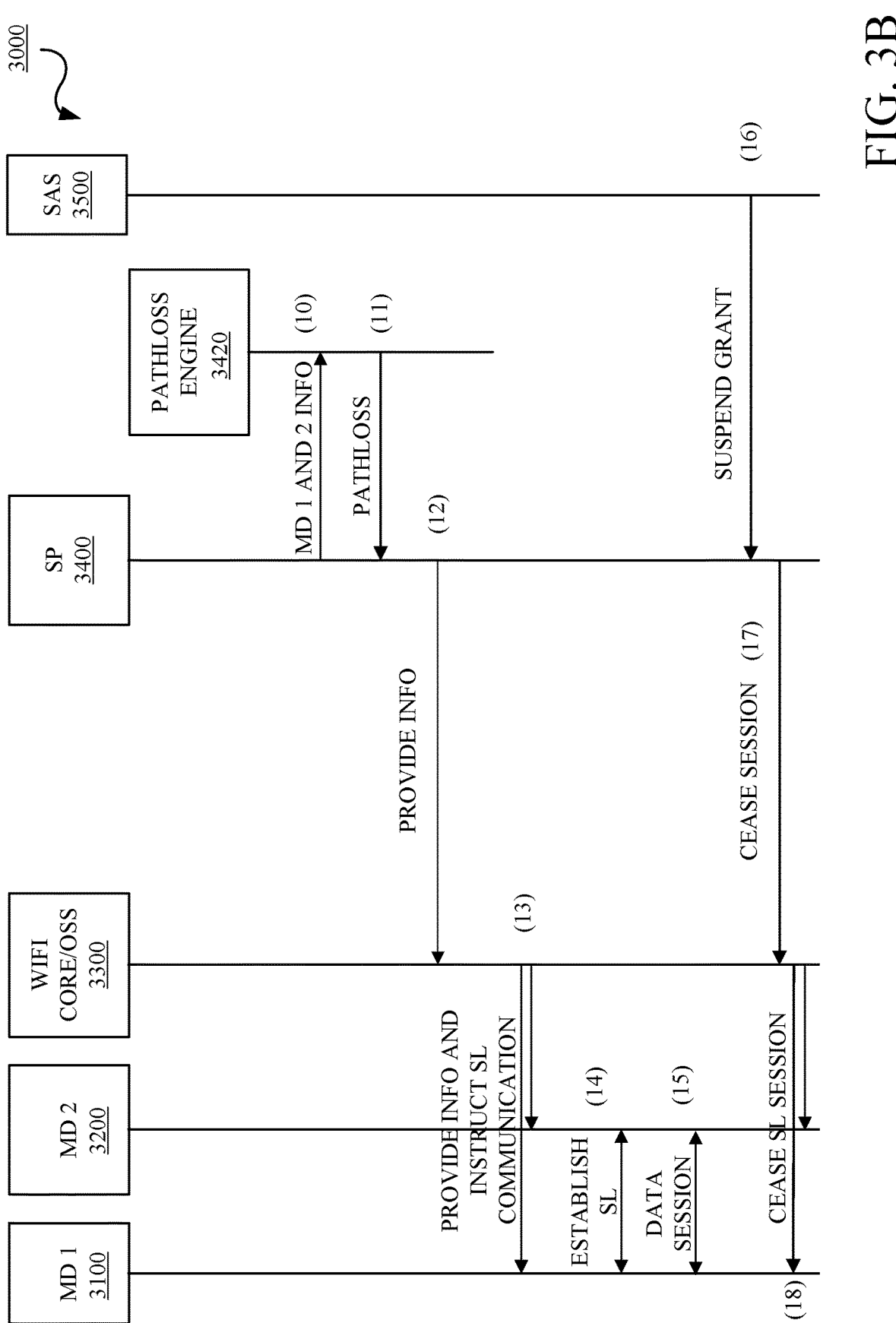

FIG. 2 is a diagram of an example of mobile devices in the wireless network architecture 1000 of FIG. 1 in accordance with embodiments of this disclosure. FIGS. 3A and 3B are a flow diagram 3000 of an example of a system using WiFi assisted sidelink communications using CBRS spectrum in accordance with embodiments of this disclosure. A base station 2100 can provide a WiFi coverage area 2110 and a base station 2200 can provide a WiFi coverage area 2210. Mobile devices 2300 and 2400 are in the WiFi coverage area 2110 and the mobile device 2500 is in the WiFi coverage area 2210. The mobile devices 2300, 2400, and 2500 are out of coverage of non-WiFi based coverage areas (e.g., coverage areas 1160 and 1230 in FIG. 1).

In this instance any of the mobile devices can attempt to establish sidelink communications with the other mobile devices using the flow diagram 3000. In FIGS. 3A and 3B, the flow diagram 3000 is operable between a mobile device 1 (MD 1) 3100, a mobile device 2 (MD2) 3200, a WiFi core/OSS 3300, a service provider system (SP) 3400, and a SAS 3500 The components stated herein may be as described in FIGS. 1 and 7.

The MD 1 3100 can send a sidelink communication or direct link request with MD 2 3200 (1), a location of the MD 1 3100 (2), and a location of the MD 2 3200 (3) to the WiFi OSS 3300. The WiFi OSS 3300 and a sidelink engine 3410 can determine using the locations of the MD 1 3100 and the MD 2 3200 whether there is a performance benefit in offloading to a sidelink channel (4). The performance can be based on amount of data to be transmitted, speed, quality, cost, and/or other related factors. A CBRS spectrum or channel request can be sent to the service provider system 3400 when a sidelink channel is found to be beneficial (5).

The service provider system 3400 can determine using the locations of the MD 1 3100 and the MD 2 3200 whether there will be an interference issue with respect to other mobile devices (e.g., other in-mobile-network mobile devices) that are in coverage areas associated with the service provider, with respect to other mobile devices operating in other networks, and with respect to already established sidelink communications (6). If no, substantially no, or minimal interference issues exist, the service provider system 3400 can send a CBRS spectrum or channel request to the SAS 3500 (7). For example, a measure of interference can be based on maintaining a low bit error rate or low block error rate (BLER). The SAS 3500 can verify availability of PAL spectrum, GAA spectrum, or combinations thereof along with grant information and duration with respect to a base station such as a gNodeB (8). The service provider system 3400 can then determine the power for the MD 1 3100 and the MD 2 3200 to ensure minimum interference with other in-mobile-network mobile devices and to ensure performance (9).

The service provider system 3400 can send the location of the MD 1 3100, the location of the MD 2 3200, the CBRS spectrum information, the power information for the MD 1 3100, the power information for the MD 2 3200, device information about the MD 1 3100, and device information about the MD 2 3200 to a pathloss engine 3420 (10). The pathloss engine 3420 can determine a pathloss from the MD 1 3100 to the MD 2 3200, the pathloss from the MD 2 3200 to the MD 1 3100, and/or combinations thereof (collectively "pathloss information") and send the pathloss information to the service provider system 3400 (11). The service provider system 3400 can send the power information for the MD 1 3100, the power information for the MD 2 3200, the pathloss information, the CBRS spectrum or channel, and the grant information and duration (collectively "sidelink communication information") to the WiFi OSS 3300 (12). The WiFi OSS 3300 can provide the sidelink communication information to the MD 1 3100 and the MD 2 3200, as applicable and appropriate (13).

The MD 1 3100 and the MD 2 3200 can establish the sidelink channel using known techniques using at least the sidelink communication information (14). The MD 1 3100 and the MD 2 3200 can communicate or have a data session directly using the established sidelink channel (15). In implementations, the sidelink channel is viable as long as at least one of the MD 1 3100 and the MD 2 3200 are in WiFi coverage. The MD 1 3100 and the MD 2 3200 have to cease the data session if both the MD 1 3100 and the MD 2 3200 are out of WiFi coverage. In implementations, the SAS 3500 can send a cease or suspend grant message to the service provider system 3400 (16). The service provider system 3400 can forward the cease or suspend grant message to the WiFi OSS 3300 (17). The WiFi OSS 3300 can notify the MD 1 3100 and the MD 2 3200 to cease communicating over the sidelink channel (18).

Figure 4:
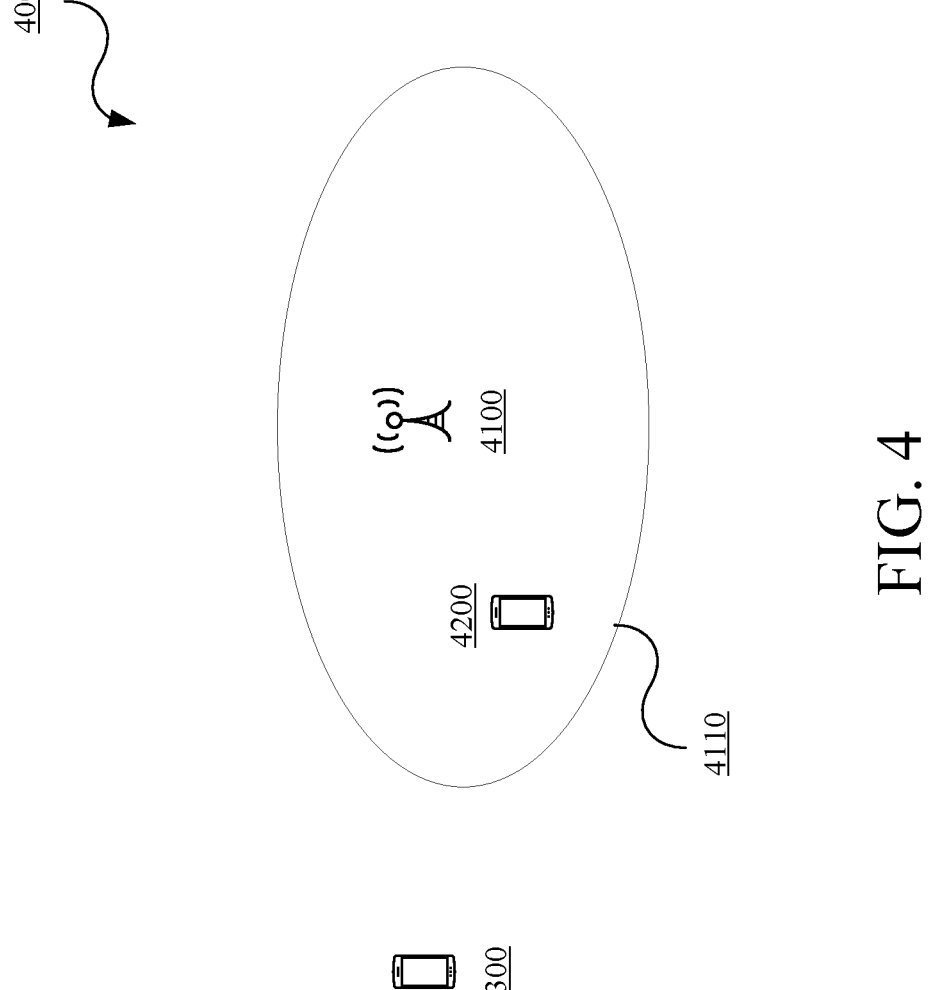
FIG. 4 is a diagram of an example of mobile devices in the wireless network architecture of FIG. 1 in accordance with embodiments of this disclosure.
Figure 5A:
FIGS. 5A and 5B are a flow diagram of an example of a system using WiFi assisted sidelink communications using Citizens Broadband Radio Service (CBRS) spectrum in accordance with embodiments of this disclosure.
Figure 5B:
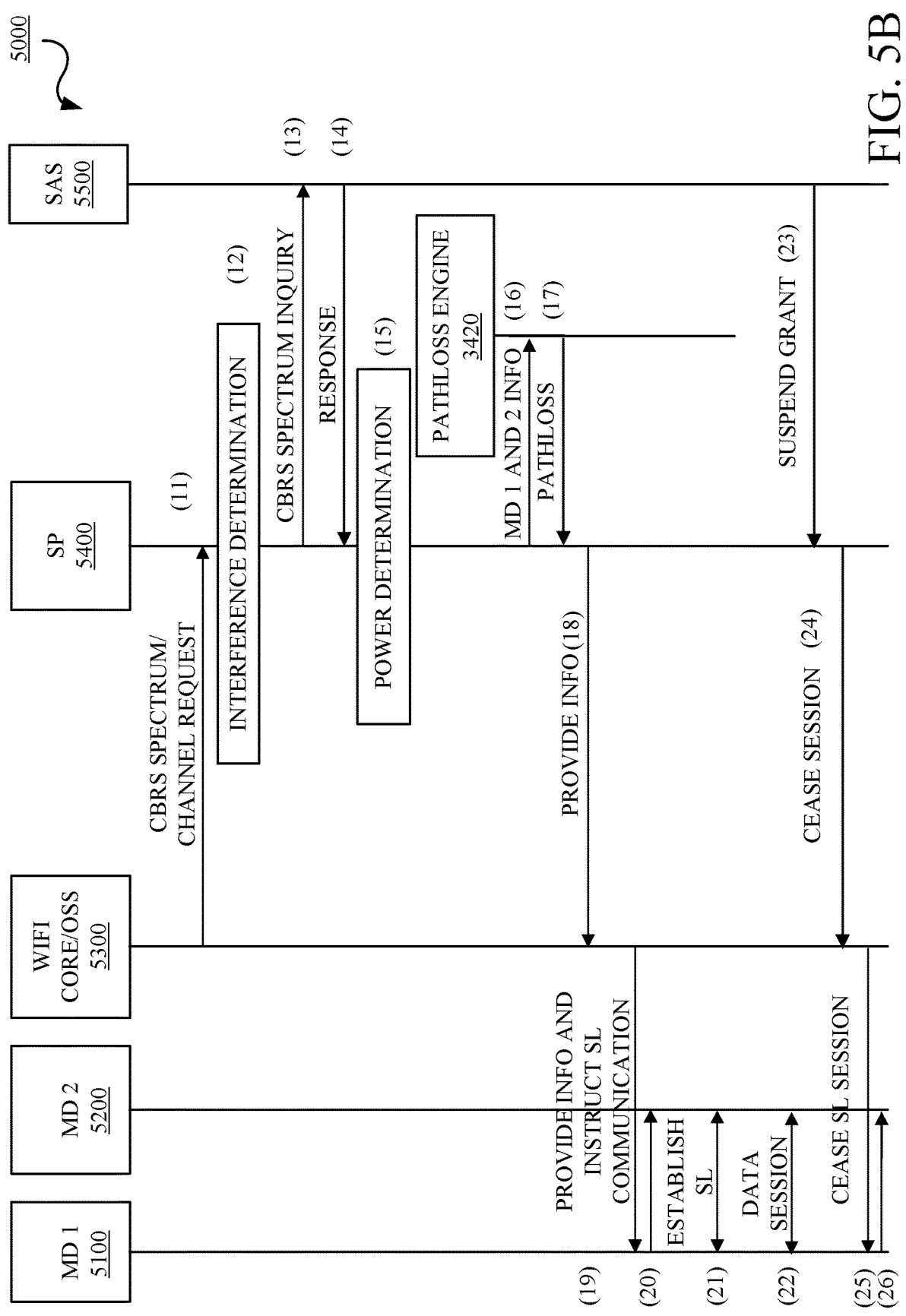

FIG. 4 is a diagram of an example of mobile devices in the wireless network architecture 1000 of FIG. 1 in accordance with embodiments of this disclosure. FIGS. 5A and 5B are flow diagrams of an example of a system using WiFi assisted sidelink communications using Citizens Broadband Radio Service (CBRS) spectrum in accordance with embodiments of this disclosure. A base station 4100 can provide a WiFi coverage area 4110. Mobile device 4200 can be in the WiFi coverage area 4110 and mobile device 4300 can be out of the WiFi coverage area 4110. The mobile device 4200 is out of coverage of non-WiFi based coverage areas (e.g., coverage areas 1160 and 1230 in FIG. 1).

In this instance, the mobile device 4200 can attempt to establish sidelink communications with the mobile device 4300 using the flow diagram 5000. In FIGS. 5A and 5B, the flow diagram 5000 is operable between a mobile device 1 (MD 1) 5100, a mobile device 2 (MD2) 5200, a WiFi core/OSS 5300, a service provider system (SP) 5400, and a SAS 5500. In this instance, the MD 1 5100 can be the mobile device 4200 and the MD2 5200 can be the mobile device 4300 as shown in FIG. 4. The components stated herein may be as described in FIGS. 1 and 7.

The MD 1 5100 can send a sidelink communication or direct link request with MD 2 5200 (1), a location of the MD 1 5100 (2), and no location of the MD 2 5200 (3) to the WiFi OSS 5300. The WiFi OSS 5300 and a sidelink engine 5410 can determine using the location of the MD 1 5100 and the last known location of the MD 2 3200 whether a sidelink communication is possible (4). The WiFi OSS 5300 can request the MD 1 5100 to perform a discovery process using the last known CBRS channel information if a sidelink communication is feasible (5). The MD 1 5100 can send a discovery message to the MD 2 5200 (6). The MD 2 5200 can respond with an acknowledgement (7). The MD 1 5100 can request location information and pathloss information from the MD 2 5200 and the MD 2 5200 can provide same (8). In implementations, the MD 2 5200 can be provisioned with predefined settings for power and other parameters to initiate a discovery protocol when the MD 2 is out of coverage (5' and 6'). In this instance, information is sent from the MD 2 5200 via the MD 1 5100 to the WiFi OSS 5300 (7'). The MD 1 5100 can provide the location information and the pathloss information of the MD 2 5200 to the WiFi OSS 5300 (9). The WiFi OSS 5300 and a sidelink engine 5410 can determine using the locations of the MD 1 5100 and the MD 2 5200 whether there is a performance benefit in offloading to a sidelink channel (10). The performance can be based on amount of data to be transmitted, speed, quality, cost, and/or other related factors. A CBRS spectrum or channel request can be sent to the service provider system 5400 when a sidelink channel is found to be beneficial (11).

The service provider system 5400 can determine using the locations of the MD 1 5100 and the MD 2 5200 whether there will be an interference issue with respect to other mobile devices (e.g., other in-mobile-network mobile devices) that are in coverage areas associated with the service provider (12) If no interference issues exist, the service provider system 5400 can send a CBRS spectrum or channel request to the SAS 5500 (13). The SAS 5500 can verify availability of PAL spectrum, GAA spectrum, or combinations thereof along with grant information and duration with respect to a base station such as a gNodeB (14). The service provider system 5400 can then determine the power for the MD 1 5100 and the MD 2 5200 to ensure minimum interference with other in-mobile-network mobile devices and to ensure performance (15).

The service provider system 5400 can send the location of the MD 1 5100, the location of the MD 5 3200, the CBRS spectrum information, the power information for the MD 1 5100, the power information for the MD 2 5200, device information about the MD 1 5100, and device information about the MD 2 5200 to a pathloss engine 5420 (16). The pathloss engine 5420 can determine a pathloss from the MD 1 5100 to the MD 2 5200, the pathloss from the MD 2 5200 to the MD 1 5100, and/or combinations thereof (collectively "pathloss information") and send the pathloss information to the service provider system 5400 (17). The service provider system 5400 can send the power information for the MD 1 5100, the power information for the MD 2 5200, the pathloss information, the CBRS spectrum or channel, and the grant information and duration (collectively "sidelink communication information") to the WiFi OSS 5300 (18). The WiFi OSS 5300 can provide the sidelink communication information to the MD 1 5100 (19). The MD 1 5100 can forward applicable and appropriate sidelink communication information to the MD 2 5200 (20).

The MD 1 5100 and the MD 2 5200 can establish the sidelink channel using known techniques using at least the sidelink communication information (21). The MD 1 5100 and the MD 2 5200 can communicate or have a data session directly using the established sidelink channel (22). In implementations, the sidelink channel is viable as long as the MD 1 5100 is in WiFi coverage. The MD 1 5100 and the MD 2 5200 have to cease the data session if the MD 1 5100 is out of WiFi coverage. In implementations, the SAS 5500 can send a cease or suspend grant message to the service provider system 5400 (23). The service provider system 5400 can forward the cease or suspend grant message to the WiFi OSS 5300 (24). The WiFi OSS 5300 can notify the MD 1 5100 (25), which in turn can notify the MD 2 5200 to cease communicating over the sidelink channel (26).

Figure 7:
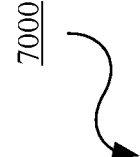
FIG. 7 is a block diagram of an example of a device in accordance with embodiments of this disclosure.
Figure 7:
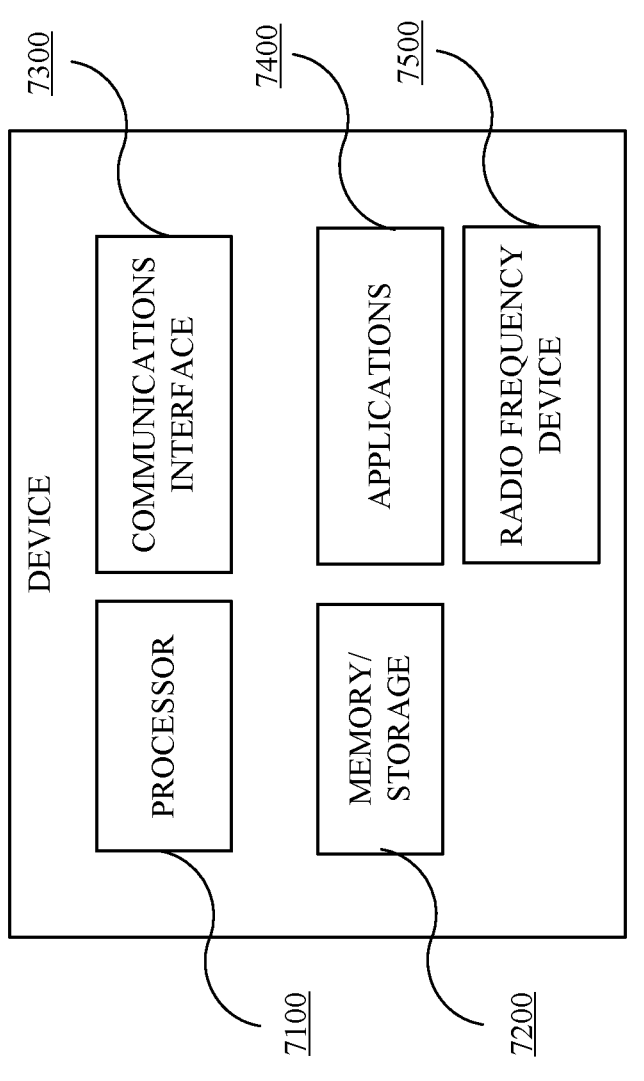

FIG. 7 is a block diagram of an example of a device 7000 in accordance with embodiments of this disclosure. The device 7000 may include, but is not limited to, a processor 7100, a memory/storage 7200, a communication interface 7300, and applications 7400. In an implementation, the device 7000 can include a radio frequency device 7500. The device 7000 may include or implement, for example, the components described with respect to FIGS. 1-5B. The applicable or appropriate flows, techniques, or methods described herein may be stored in the memory/storage 7200 and executed by the processor 7100 in cooperation with the memory/storage 7200, the communications interface 7300, the applications 7400, and the radio frequency device 7500 (when applicable), as appropriate. The device 7000 may include other elements which may be desirable or necessary to implement the devices, systems, and methods described herein. However, because such elements and steps do not facilitate a better understanding of the disclosed embodiments, a discussion of such elements and steps may not be provided herein.

FIG. 8 is a flowchart of an example method 8000 for using WiFi assisted sidelink communications using CBRS spectrum in accordance with embodiments of this disclosure. The method 8000 includes: receiving 8100 from a mobile device by a wireless local area network system a request for sidelink communications with another mobile device; sending 8200 by the wireless local area network system to a service provider system a request for Citizens Broadband Radio Service (CBRS) spectrum when the sidelink communications is beneficial based on at least locations of the mobile device and the another mobile device; receiving 8300 by the wireless local area network system from the service provider system a sidelink communications information including a CBRS grant when an interference check passes; and sending 8400 by the wireless local area network system to at least the mobile device the sidelink communications information to enable establishment of the sidelink communications between the mobile device and the another mobile device. The method 8000 can be implemented, for example, in or by components described with respect to FIGS. 1-5B and 7, as appropriate and applicable.

The method includes receiving 8100 from a mobile device by a wireless local area network system a request for sidelink communications with another mobile device. The mobile device and the another mobile device are provisioned to operate on at least networks and systems provided, operated, and/or owned by a service provider. The networks and systems include wireless networks and wireless local area networks. In this instance, the mobile device and the another mobile device are out of coverage of the wireless networks. At least one of the mobile device and the another mobile device are in a coverage area of a wireless local area network. In this instance, the mobile device is in the coverage area of the wireless local area network. The mobile device sends a sidelink communication, direct link, or device-to-device request which can include identification of the another mobile device. The mobile device can send information about the mobile device such as at least location and device information. If available, the mobile device can send information about the another mobile device such as at least location and device information. In implementations, the request and other described information can be sent in one message. In the event the location of the another device is not available, the wireless local area network system can send a CBRS channel last used by the another mobile device to initiate a discovery process if the wireless local area network system has determined that a sidelink communications may be feasible based on a last known location of the another mobile device. The mobile device can initiate the discovery process to obtain information from the another mobile device such as the location and the pathloss. The mobile device can then forward this information to the wireless local area network system.

The method includes sending 8200 by the wireless local area network system to a service provider system a request for Citizens Broadband Radio Service (CBRS) spectrum when the sidelink communications is beneficial based on at least locations of the mobile device and the another mobile device. The wireless local area network system uses at least the location information of the mobile device and the another mobile device to determine if there are performance benefits to using sidelink communications as described herein. The benefits can be applicable to the mobile devices, the service provider, and/or combinations thereof. If beneficial, the service provider system can perform an interference analysis to ensure that other mobile devices that are in wireless coverage and in wireless local area network coverage will not be subject, will be minimally subject, or will be negligibly subject to interference due to the sidelink communications before allowing the sidelink communications. A request can be sent to the SAS if benefits do exist and the interference check passes.

The method includes receiving 8300 by the wireless local area network system from the service provider system a sidelink communications information including a CBRS grant when an interference check passes. The service provider system can determine a power requirement and pathloss for each mobile device. The service provider system can provide the power requirement, pathloss, approval for sidelink communications and other information as part of the sidelink communications information to the wireless local area network system.

The method includes sending 8400 by the wireless local area network system to at least the mobile device the sidelink communications information to enable establishment of the sidelink communications between the mobile device and the another mobile device. In the event, that the other mobile device is not in the coverage area of the wireless local area network, then the mobile device can forward the sidelink communications information to the other mobile device. The sidelink communications can exist as long as one of the mobile device or the another mobile device (if applicable) is in the coverage area of the wireless local area network. Use of the CBRS spectrum can be ceased or suspended by the SAS via the service provider system and the wireless local area network system.

Disclosed herein is a method for wireless local area network system assisted sidelink communications using Citizens Broadband Radio Service (CBRS) spectrum. In an implementation, the method includes receiving, from a mobile device by a wireless local area network system, a request for sidelink communications with another mobile device. The wireless local area network system sends to a service provider system, a request for Citizens Broadband Radio Service (CBRS) spectrum when the sidelink communications is beneficial based on at least a known location of the mobile device and a location of the another mobile device. The wireless local area network system receives from the service provider system, a sidelink communications information including a CBRS grant when an interference check passes. The wireless local area network system sends to at least the mobile device, the sidelink communications information to enable establishment of the sidelink communications between the mobile device and the another mobile device.

In implementations, the mobile device and the another mobile device are out of coverage area of non-wireless local area network systems. In implementations, the mobile device is in a coverage area of the wireless local area network system and the another mobile device is out of coverage area of the wireless local area network systems. In implementations, the sidelink communications information includes at least pathloss information for the mobile device and pathloss information for the another mobile device. In implementations, the sidelink communications information includes at least power information for the mobile device and power information for the another mobile device. In implementations, when the location of the another mobile device is unknown, the method includes using, by the wireless local area network system, a last known location of the another mobile device to determine sidelink communications feasibility. In implementations, the method further includes initiating, by the wireless local area network system, a discovery process at the mobile device with respect to the another mobile device to determine the location of the another mobile device when sidelink communications is feasible. In implementations, when the another mobile device is out of coverage of the wireless local area network system, the method further includes receiving, by the wireless local area network system from the mobile device, the location of the another mobile device based on a discovery process. In implementations, the method further includes sending, by the wireless local area network system to at least one of the mobile device and the another mobile device, a cease sidelink communications message when the CBRS grant is suspended. In implementations, the method further includes sending, by the wireless local area network system to at least one of the mobile device, a cease sidelink communications message when the mobile device and the another mobile device are out of coverage of the wireless local area network system.

Disclosed herein is a system for wireless local area network system assisted sidelink communications using Citizens Broadband Radio Service (CBRS) spectrum. The system includes a wireless local area network system in communication with a service provider system. The wireless local area network system configured to receive a request for a direct link from one of a first mobile device and a second mobile device, send a shared spectrum request to the service provider system when the direct link between the first mobile device and the second mobile device provides performance benefits to at least the first mobile device and the second mobile device, receive a shared spectrum grant from the service provider system, and send the shared spectrum grant to at least one of the first mobile device and the second mobile device to enable establishment of the direct link.

In implementations, the first mobile device and the second mobile device are out of coverage area of non-wireless local area network systems and at least one of the first mobile device and the second mobile device are in a coverage area of the wireless local area network system. In implementations, the wireless local area network system is further configured to send pathloss information for the first mobile device and pathloss information for the second mobile device to at least one of the first mobile device and the second mobile device. In implementations, the wireless local area network system is further configured to send power information for the first mobile device and power information for the second mobile device to at least one of the first mobile device and the second mobile device. In implementations, the wireless local area network system is further configured to request one of the first mobile device and the second mobile device to execute a discovery process to determine a location of the other one of the first mobile device and the second mobile device when the location of the other one is unknown. In implementations, the wireless local area network system is further configured to request one of the first mobile device and the second mobile device to execute a discovery process to determine a location of the other one of the first mobile device and the second mobile device when the other one is out of coverage of the wireless local area network system. In implementations, the wireless local area network system is further configured to send a cease direct link message to at least one of the first mobile device and the second mobile device when both of the first mobile device and the second mobile device are out of coverage of the wireless local area network system.

Disclosed herein is a method for wireless local area network system assisted sidelink communications using Citizens Broadband Radio Service (CBRS) spectrum. The method includes receiving, by a wireless local area network system, a request for a direct link from one of a first mobile device and a second mobile device. The service provider system performs an interference analysis based on a location of the first mobile device and a location of the second mobile device when the direct link between the first mobile device and the second mobile device provides performance benefits, requests a shared spectrum when there is a lack of interference due to the direct link, performs pathloss and power calculations for the first mobile device and the second mobile device upon receipt of a shared spectrum grant, and send the pathloss and power calculations for the first mobile device and the second mobile device and the shared spectrum grant to at least one of the first mobile device and the second mobile device to initiate establishment of the direct link.

In implementations, the first mobile device and the second mobile device are out of coverage area of non-wireless local area network systems and at least one of the first mobile device and the second mobile device are in a coverage area of the wireless local area network system. In implementations, the method further includes requesting, by the wireless local area network system, one of the first mobile device and the second mobile device to execute a discovery process to determine a location of the other one of the first mobile device and the second mobile device when the other one is out of coverage of the wireless local area network system.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more the computer readable mediums having the computer readable program code embodied thereon. For example, the computer readable mediums can be non-transitory. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A method for wireless local area network system assisted sidelink communications using Citizens Broadband Radio Service (CBRS) spectrum, the method comprising:

receiving, from a mobile device by a wireless local area network system, a request for sidelink communications with another mobile device;

sending, by the wireless local area network system to a service provider system, a request for Citizens Broadband Radio Service (CBRS) spectrum when the sidelink communications is beneficial based on at least a known location of the mobile device and a location of the another mobile device;

receiving, by the wireless local area network system from the service provider system, a sidelink communications information including a CBRS grant when an interference check passes; and sending, by the wireless local area network system to at least the mobile device, the sidelink communications information to enable establishment of the sidelink communications between the mobile device and the another mobile device.

2. The method of claim 1, wherein the mobile device and the another mobile device are out of coverage area of non-wireless local area network systems.

3. The method of claim 1, wherein the mobile device is in a coverage area of the wireless local area network system and the another mobile device is out of the coverage area of the wireless local area network systems.

4. The method of claim 1, wherein the sidelink communications information includes at least pathloss information for the mobile device and pathloss information for the another mobile device.

5. The method of claim 4, wherein the sidelink communications information includes at least power information for the mobile device and power information for the another mobile device.

6. The method of claim 1, wherein when the location of the another mobile device is unknown, the method comprising:

using, by the wireless local area network system, a last known location of the another mobile device to determine sidelink communications feasibility.

7. The method of claim 6, the method further comprising:

initiating, by the wireless local area network system, a discovery process at the mobile device with respect to the another mobile device to determine the location of the another mobile device when sidelink communications is feasible.

8. The method of claim 1, wherein when the another mobile device is out of coverage of the wireless local area network system, the method further comprising:

receiving, by the wireless local area network system from the mobile device, the location of the another mobile device based on a discovery process.

9. The method of claim 1, the method further comprising:

sending, by the wireless local area network system to at least one of the mobile device and the another mobile device, a cease sidelink communications message when the CBRS grant is suspended.

10. The method of claim 1, the method further comprising:

sending, by the wireless local area network system to at least one of the mobile device, a cease sidelink communications message when the mobile device and the another mobile device are out of coverage of the wireless local area network system.

11. A system, comprising:

a wireless local area network system in communication with a service provider system, the wireless local area network system configured to:

receive a request for a direct link from one of a first mobile device and a second mobile device;

send a shared spectrum request to the service provider system when the direct link between the first mobile device and the second mobile device provides performance benefits to at least the first mobile device and the second mobile device and passes an interference check;

receive a shared spectrum grant from the service provider system; and send the shared spectrum grant to at least one of the first mobile device and the second mobile device to enable establishment of the direct link.

12. The system of claim 11, wherein the first mobile device and the second mobile device are out of coverage area of non-wireless local area network systems and at least one of the first mobile device and the second mobile device are in a coverage area of the wireless local area network system.

13. The system of claim 11, wherein the wireless local area network system is further configured to:

send pathloss information for the first mobile device and pathloss information for the second mobile device to at least one of the first mobile device and the second mobile device.

14. The system of claim 11, wherein the wireless local area network system is further configured to:

send power information for the first mobile device and power information for the second mobile device to at least one of the first mobile device and the second mobile device.

15. The system of claim 11, wherein the wireless local area network system is further configured to:

request one of the first mobile device and the second mobile device to execute a discovery process to determine a location of other one of the first mobile device and the second mobile device when the location of the other one is unknown.

16. The system of claim 11, wherein the wireless local area network system is further configured to:

request one of the first mobile device and the second mobile device to execute a discovery process to determine a location of other one of the first mobile device and the second mobile device when the other one is out of coverage of the wireless local area network system.

17. The system of claim 11, wherein the wireless local area network system is further configured to:

send a cease direct link message to at least one of the first mobile device and the second mobile device when both of the first mobile device and the second mobile device are out of coverage of the wireless local area network system.

18. A method for wireless local area network system assisted sidelink communications using Citizens Broadband Radio Service (CBRS) spectrum, the method comprising:

receiving, by a wireless local area network system, a request for a direct link from one of a first mobile device and a second mobile device;

performing, by a service provider system, an interference analysis based on a location of the first mobile device and a location of the second mobile device when the direct link between the first mobile device and the second mobile device provides performance benefits;

requesting, by the service provider system, a shared spectrum when there is a lack of interference due to the direct link;

performing, by a service provider system, pathloss and power calculations for the first mobile device and the second mobile device upon receipt of a shared spectrum grant; and sending, by the wireless local area network system, the pathloss and power calculations for the first mobile device and the second mobile device and the shared spectrum grant to at least one of the first mobile device and the second mobile device to initiate establishment of the direct link.

19. The method of claim 18, wherein the first mobile device and the second mobile device are out of coverage area of non-wireless local area network systems and at least one of the first mobile device and the second mobile device are in a coverage area of the wireless local area network system.

20. The method of claim 18, the method further comprising:

requesting, by the wireless local area network system, one of the first mobile device and the second mobile device to execute a discovery process to determine a location of the other one of the first mobile device and the second mobile device when the other one is out of coverage of the wireless local area network system.

\* \* \* \* \*